Aug. 26, 1930. W. WESTWOOD 1,773,800
MACHINE SAW
Filed May 19, 1928

INVENTOR:-
William Westwood
per. George Hughes
ATTORNEY

Patented Aug. 26, 1930

1,773,800

UNITED STATES PATENT OFFICE

WILLIAM WESTWOOD, OF LONDON, ENGLAND, ASSIGNOR TO FRED CECIL JARVIS, LORD LESLIE JARVIS, AND ALFRED WALLACE JARVIS, ALL OF LONDON, ENGLAND

MACHINE SAW

Application filed May 19, 1928, Serial No. 279,113, and in Great Britain June 10, 1927.

This invention relates to saw machines, and more particularly to saw machines of the type consisting of a bench or table adapted to have placed upon it lengths of wood to be cut by moving the table relative to a rotary saw, band saw or other suitable saw, which in general practice operates through a slot in the table or bench. These machine saws are suitable for cutting up lengths of wood, such as for instance bits of wood for parquet flooring. In existing machines of this type it is usual to have the table top mounted to slide on runners or ball bearings, and the disadvantage of these machines is the tendency for the table or bench to acquire a slight lateral movement relative to the supports, this being due to the play in the bearings. The result of this is that not infrequently large quantities of wood are cut incorrectly. For example, in cutting up wood for parquet flooring, the cut pieces very often require subsequent "trueing up" to correctly fit the pieces. The object of my invention is to provide a construction of saw machine having a moving table or bench which can be moved for cutting operations in such manner as to ensure an accurate and good cut of the wood to be cut. Another object of my invention is to provide a cheap and efficient machine which can be readily dis-assembled and assembled, and when dis-assembled will occupy a fairly small space.

Broadly my invention consists in supporting the movable bench or table of a saw machine for endwise movement relative to the saw by a swinging support in distinction to the present practice of mounting it slidably upon guides and/or ball or roller bearings so that although as in present practice a push on one end of the table will move the work along the saw, the construction and arrangement of the swinging support is such that when the table is pushed to feed the work along the saw, the table, and consequently the work, will during such pushing and feeding operations continually change their working plane.

According to the preferred embodiment of my invention a saw machine consists of a table or bench having the usual saw opening and mounted so that its ends are arranged to swing backwards or forwards each about a separate axis disposed some distance from the table or bench. This can be effected by supporting the table by the upper ends of a pair of vertical frames each adapted to swing about a pivotal support at its lower end. It is preferred to have the two pivotal supports for the lower ends of the said frames closer together than the pivotal connections of the upper ends of the frames to the table, so that the table when swinging backwards and forwards from its normal horizontal position will form a gradually increasing angle with the horizontal plane, or in other words one end would travel upwards whilst the other travels downward. I find that this results in a much better cut than if the wood to be cut is merely moved in one horizontal plane across the saw and further increases the life of the saw.

Suitable means, such as springs, may be provided for maintaining the table in and returning it to the normal horizontal position.

In order that my invention may be clearly understood and readily carried into effect, I have appended hereto a sheet of drawings illustrating in perspective an embodiment of same.

Figures 1, 2:
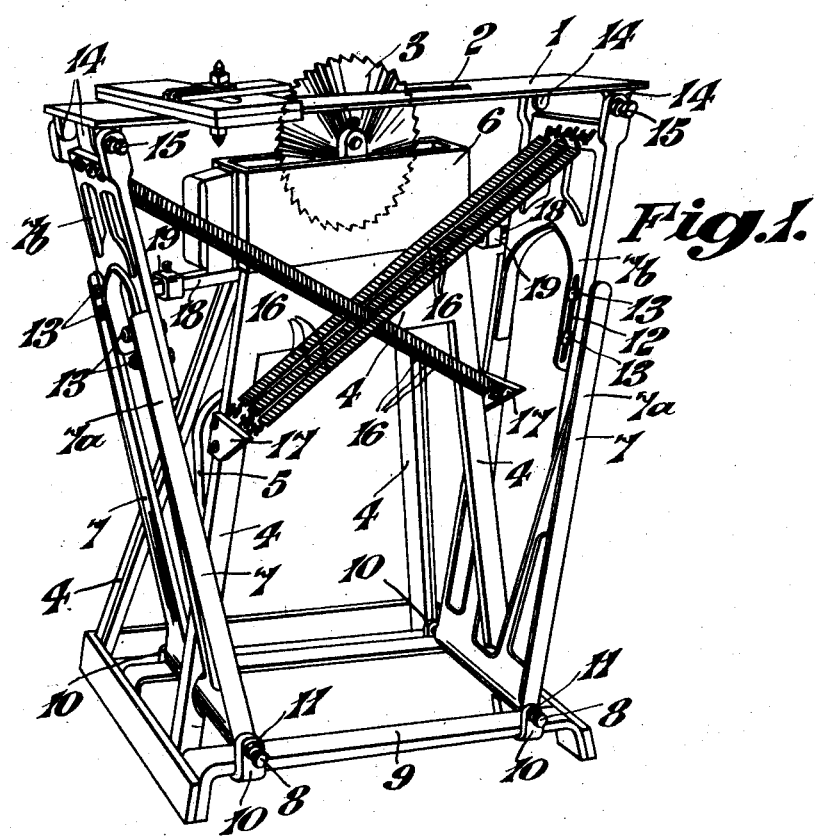
Fig. 1 is a view in perspective illustrating an embodiment of the device.
Fig. 2 is a detail view showing a method of pivotally supporting the swinging frames.

Referring to the drawings, the machine table 1 has the usual slot 2 in which operates a suitable saw 3 driven by an electric motor or other suitable means. In the embodiment illustrated the saw is driven by an electric motor supported by a fixed vertical frame 4, the lead for coupling to the supply main being indicated at 5.

The table 1 has a fair clearance from the top of the frame 4 and the motor casing 6 and is supported adjacent its corners by two swinging frames 7 or four swinging arms, each of which is adapted to swing about an axis adjacent the base 9. It is preferred to obtain the axis for each swinging frame 7 by means of a pair of axially aligned screws 8 threaded into lugs 10 on the base 9 and secured by lock nuts 11 in selected position, the screws 8 each having a pointer and engaged in a recess in the frame 7 whereby any "play" of the frames 7 due to wear of their pivotal supports can be taken up by adjusting the screws 8. This is shown more in detail in the broken detail view at the bottom right hand corner of the drawings, the nut 11 and lug 10 being shown broken to expose the screw 8.

The frames 7, or their equivalent, for instance legs, can be adjustable in length to vary the height of the table 1 or adjust its normal position. This can be effected by forming each frame 7 of two parts 7a and 7b, the latter and upper part being secured by bolts 13 passing through holes in the upper ends of the parts 7 and slots 12 in the parts 7b.

It is preferred to support the table 1 by the upper ends of the legs 7 in the same manner as the legs are supported by the base 9, to ensure adjustment for wear. For this purpose, each corner of the table 1 has a depending lug 14 which receives the pointer end of a bolt 15 in a manner similar to the engagement of the bolt 8 with the lower end of the frames 7.

It will be appreciated from the foregoing that the table 1 is supported in substantially the same manner as a parallel link arrangement, but it is preferred to have the legs 7 diverging outwards upwardly, whereby the table 1 will when moved backwards or forwards gradually change its angle relative to the horizontal plane. This ensures a highly efficient cutting of the wood and further there is no need for lateral play or displacement of the table.

To maintain in and return the table to its normal horizontal position, a suitable number of coiled springs 16 are connected to the upper ends of the legs 7, or to the ends of the table 1, and to brackets or other suitable means on the frame 4 or other fixed points. The springs intersect each other and when the table 1 is horizontal they are symmetrical.

To predetermine or limit the amount of swinging movement to be given to the table 1 and frames 7 suitable adjustable abutments may be provided. For this purpose, I have shown a bar 18 secured to the frame 4 and having slidable along each end of it a U shaped or other suitable abutment 19 adapted to lie in the path of two of the legs 7. These abutments can when desired be adjusted to hold the table against movement.

What I claim is:—

In a saw machine of the type set forth a table having the usual saw opening, a pair of vertical frames wholly supporting said table, coiled extension springs connecting said frames to a fixed saw carrying member spaced from the table and vertical frames, a base frame, pivotal connections between the upper end of said vertical frames and the table, and pivotal connections between the lower ends of said vertical frames and the base frame, each frame comprising two parts connected end to end one above the other, each upper part being adjustable up and down relative to the lower part, the lower pivots of the said frames being closer together than the upper pivots, a support for the saw carrying member fixed to said base frame, and adjustable abutments for limiting the swinging of the vertical frames towards the saw carrying structure.

In witness hereof I have signed this specification.

WILLIAM WESTWOOD.